(12) United States Patent
Connole

(10) Patent No.: US 7,591,091 B2
(45) Date of Patent: Sep. 22, 2009

(54) ANIMAL IDENTIFICATION

(75) Inventor: Michael John Connole, Jura (CH)

(73) Assignee: Allflex Australia Pty. Limited, Queensland (AU)

( * ) Notice: Subject to any disclaimer, the term of this patent is extended or adjusted under 35 U.S.C. 154(b) by 98 days.

(21) Appl. No.: 10/567,705

(22) PCT Filed: Aug. 9, 2004

(86) PCT No.: PCT/NZ2004/000177

§ 371 (c)(1),
(2), (4) Date: Dec. 12, 2006

(87) PCT Pub. No.: WO2005/013677

PCT Pub. Date: Feb. 17, 2005

(65) Prior Publication Data

US 2007/0101626 A1    May 10, 2007

(30) Foreign Application Priority Data

Aug. 7, 2003    (AU) .............................. 2003904134

(51) Int. Cl.
*G09F 3/00*    (2006.01)
(52) U.S. Cl. ....................................... 40/301; 600/584
(58) Field of Classification Search ........... 40/300–304, 40/633, 666; 600/584
See application file for complete search history.

(56) References Cited

U.S. PATENT DOCUMENTS

| | | | | |
|---|---|---|---|---|
| 4,122,947 A | * | 10/1978 | Falla | 206/569 |
| 6,509,187 B2 | * | 1/2003 | Brem | 435/288.2 |
| 7,198,629 B2 | * | 4/2007 | Brem | 606/116 |
| 2007/0013529 A1 | * | 1/2007 | Kantrowitz et al. | 340/573.4 |

FOREIGN PATENT DOCUMENTS

| | | |
|---|---|---|
| DE | 201 01 015 | 1/2002 |
| DE | 101 610 268 | 7/2003 |
| EP | 1 060 662 A1 | 12/2000 |
| EP | 1234498 | 8/2002 |
| ES | 2149694 | 11/2000 |
| WO | WO 98/47351 | 10/1998 |
| WO | WO 03/000045 | 1/2003 |
| WO | WO 03/034815 A1 | 5/2003 |

\* cited by examiner

*Primary Examiner*—Cassandra Davis
(74) *Attorney, Agent, or Firm*—Blakely, Sokoloff, Taylor & Zafman LLP

(57) ABSTRACT

A system for identification of animals. The system includes an animal identification device adapted for application to an animal and a device for secure storage of organic material taken from the animal to be identified by the identification device. The storage device and identification device each are marked with a common identifier. The identification device and the storage device are mounted, prior to use, in a holder which can be in the form of a moulded tray.

18 Claims, 4 Drawing Sheets

ANIMAL IDENTIFICATION

The present patent application is a non-provisional application of International Application No. PCT/NZ2004/000177, filed Aug. 9, 2004.

BACKGROUND TO THE INVENTION

This invention relates to improvements in animal identification.

Worldwide there is a trend toward secure identification and tracking of animals, especially those intended for human consumption. For example, in many countries it is obligatory to provide a means of identification of animals such as cattle, sheep, pigs and goats to achieve a means of health tracking of the animals. The identification is achieved by marking the animals.

Visual or electronic eartags are a common method of identification. The identification can be in the form, which relates to the animal and to its biological data and geographical origin e.g. the place it was bred, the herd of origin and the breeder.

The animal identification marking(s) and data relating to the animal are generally held in centralised, computerised databanks. The information held in the databanks can be accessed by interested or need to know parties. The databanks can, for example, be accessed for updating and information retrieval by say breeders, government authorities, livestock organisations, veterinary services and the like.

Efforts to achieve maximum security of identification of individual animals have resulted in animal tag manufacturers coming up with designs of tags, which are so-called tamper-proof. This means that the tags cannot be readily removed from an animal. Also, or alternatively, the tags can be constructed so that if removed the tag is unable to be reused or if reused, it is tamper-evident. A tamper-evident marking device alerts authorities and the like to the possibility that the animal does not relate to the marking that it carries.

In the further pursuit of security or integrity of identification of individual animals, proposals have been made for sampling organic material from animals for storage and later DNA analysis. For example, patent specification WO 9961882 discloses a device and procedure whereby a sample of organic tissue is punched or cut from the animal and placed in a receptacle. The receptacle may then be combined with an eartag with both the receptacle and tag having the same markings.

Other similar proposals have been made. For example, EP 1060662 describes an eartag where the male punch has a cutting means, which is detachable from the punch. It is then housed in a capsule, which is carried in the female portion of the tag.

Patent specification WO 0118239 discloses a device for collecting and storing a biological sample for subsequent analysis, the device comprising tamper-evident storage means for storing the sample. The storage means is suitable for digestion, together with the biological sample, for analysis.

Previous attempts at providing secure identification and tracking of animals has therefore concentrated on the individual physical elements or components used in conjunction with an animal e.g. an eartag, a device for secure storage of sample organic material etc. As a consequence, the integrity of the information is not assured, as it is open to human error.

For example, it is common that the markings with correlate a biological sample to an identification means (whether it be visual or electronic) carried by the animal, is achieved by the farmer or a technician physically marking the sample and/or the on-animal identification device. Consequently, there is a high degree of possibility that the device storing the biological sample will be provided with an incorrect marking for the animal from which the sample was taken.

SUMMARY OF THE INVENTION

It is therefore an object of the present invention to provide a method and means of providing a more secure arrangement for ensuring that a biological sample taken from an animal is correctly identified as coming from that particular animal.

Broadly according to one aspect of the present invention there is provided a system for identification of animals, the system including an animal identification device adapted for application to an animal and a device for secure storage of organic material taken from the animal to be identified by the identification device, the storage device and identification device each being marked with a common identifier.

Preferably the identification device and the storage device are mounted, prior to use, in a holder. The holder can be in the form of a moulded tray.

The identification device in one form of the invention can be an animal eartag or a bolus. Preferably if the identification device is an eartag, it is a two-component eartag.

The storage device is preferably removably secured to the eartag or one component of the eartag. The identification device can also be formed by an electronic identification device optionally, and preferably, in combination with a visual identification eartag.

In the preferred form of the invention the common identifier is an alpha, numeric or alphanumeric marking. The common identifier can be the on-farm management identifier (usually numeric) used for visual identification of the animal. The common identifier can be the unique number of an electronic identification device.

According to a second broad aspect of the invention there is provided a method of identification of an animal including providing an animal identification device marked with an identifier marking, a secure storage device, the secure storage device also being marked with the same identifier marking, taking a sample of organic material from the animal and placing the sample in the secure storage device and applying the identification device to the animal and placing the storage device in a secure storage facility.

BRIEF DESCRIPTION OF THE DRAWINGS

In the following more detailed description of preferred embodiments of the present invention reference will be made to the accompanying drawings in which.

DESCRIPTION OF PREFERRED EMBODIMENTS OF THE INVENTION

Figure 1:
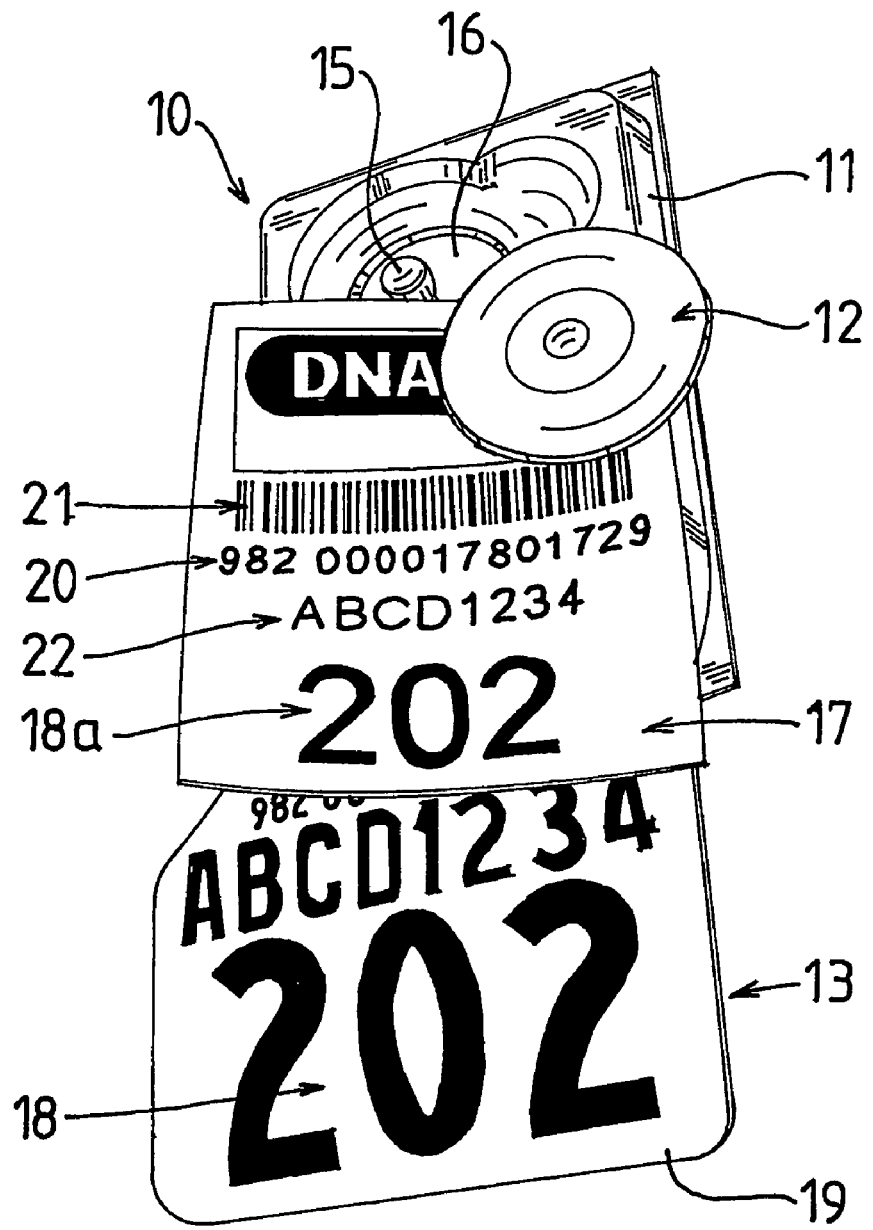
FIG. 1 is an illustration of an arrangement of a visual animal identification eartag and sample storage device for a sample of organic material taken from the animal to which the identification device is applied.
Figure 2:
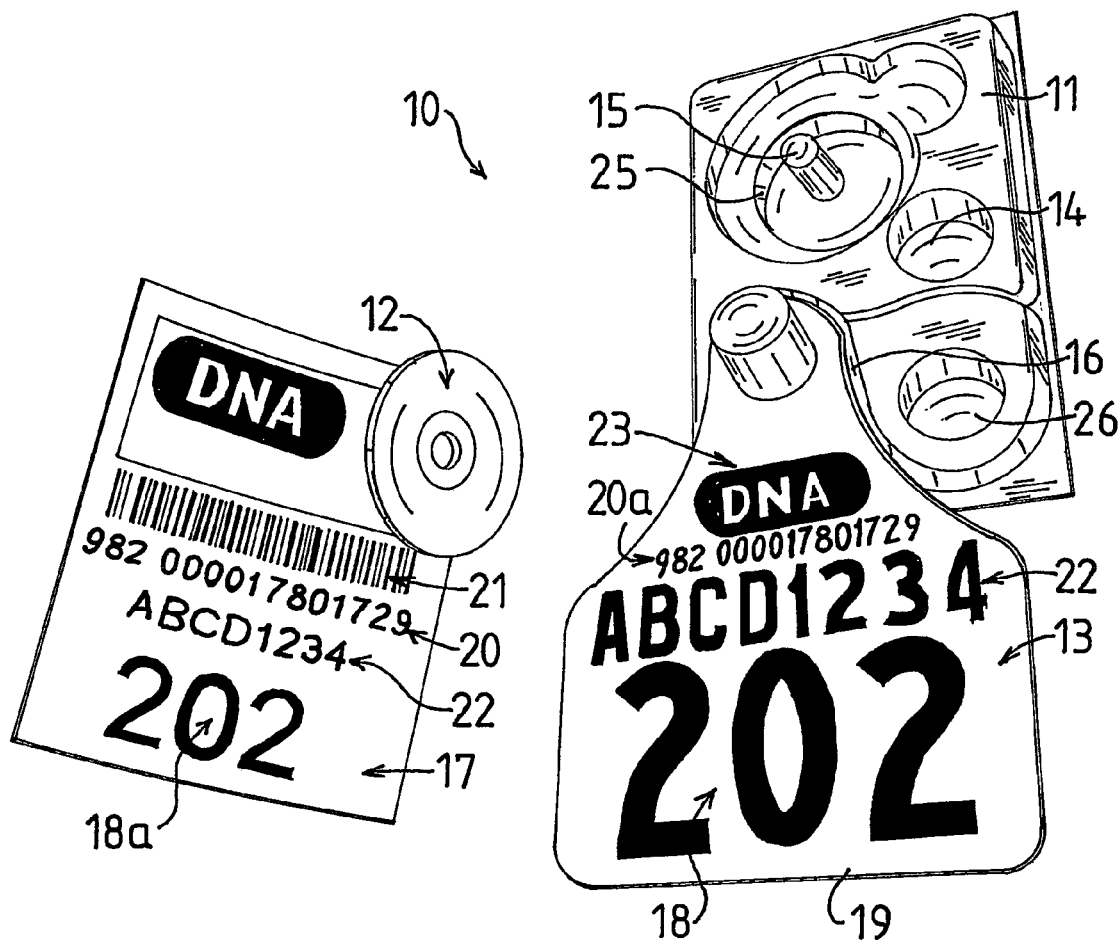
FIG. 2 is an illustration similar to FIG. 1 but showing the sample storage device removed from the storage tray, together with a part of the animal identification device.

As shown in FIGS. 1 and 2, it is proposed that a farmer or animal breeder will be supplied with a "kit" 10 intended for use in the identification and sampling of organic material from a particular animal. The kit 10 according to the illustrated form of the invention includes a tray 11 which can conveniently be moulded from plastic material. Removably engaged with the tray 11 is a visual identification eartag. In the illustrated form the eartag is of a two-part construction, namely, a male component 12 and a female component 13. This is by way of example only.

In the illustrated form of the invention, the male component 12 and female component 13 are of the type, which is manufactured and marketed under the brand ALLFLEX®. The type of two-piece tag is well known to those skilled in the art thus a detailed description of the construction and use of the eartag is not required.

The tray 11 incorporates a recess 14 (see FIG. 2) into which the conical shaped head of the stem of the male tag component 12 can be removably engaged. In one form, the arrangement is such that the head can be a friction fit in the recess 14. In another arrangement, it can be snap-locked into the recess. This is achieved by the shoulder of the head of the male component 12 being pushed, with sufficient pressure, to engage past a lip or ridge (not shown) continuously or non-continuously located along the peripheral wall of the recess 14.

It will be appreciated by those skilled in the art that if the snap-fit arrangement is used the arrangement will be such that the tag can be readily pulled out of the recess.

Similarly, the female component 13 is fitted to the tray 11. Therefore, a peg (not shown but of the type shown at 15) can be provided to friction fit into the female opening formed in the tag part 13. As can be seen, the peg on which the female component is engaged can be located within a recess portion 16. The recess portion 16 can be shaped to provide clearance for the neck and part of the shoulder portion of the female tag component 13 as shown in FIG. 2.

The kit 10 further includes a device 17 for storage of organic material sampled from the animal. The construction of device 17 and how it is used to store an organic material sample will not hereinafter be described as the construction and method of use of the device 17 is not relevant to the present invention. Also, device 17 can take different forms which do not impact on the present invention. For example, the device can comprise a test tube type product, a capsule, a moulded sealable container, and other types of sample "collectors" known in the art.

The general form of collector 17 depicted in the drawings is thus by way of example only.

According to the present invention, the device 17 is provided with a hole or aperture (not readily visible in the illustrations) formed in an appropriate part of the device. In the illustrated form of the invention, this opening is punched into the top right hand corner of the device 17.

The diameter of the hole punched in the device 17 is preferably less than the greatest cross-sectional diameter of the head portion of the stem of the male component 12. It is, however, greater than the diameter of the stem adjacent the head. Accordingly, the head of the male component 12 can be forced through the opening in the device 17 so that the device 17 becomes retained on the stem of the male component 12.

This not only provides a convenient means of anchoring the device 17 into the kit 10 (see FIG. 1) but also means that when the male component 12 is removed from the tray 11 in preparation for application of the tag components 12 and 13 to the animal, the device 17 remains with the male component 12. However, the device 17 is removed from the stem of the male component 12 prior to the tag components 12 and 13 being applied to the animal.

In an alternative arrangement the device 17 could be anchored to the male component by such other means, that it could be removed prior to the tag being applied to the animal.

To ensure the integrity of the relationship between the device 17 and the animal to which the eartag is applied, it is proposed that the sample organic material (e.g. one or more hair samples of the animal) will be removed from the animal and placed into the device 17. This can take place while the component parts of the kit 10 are still attached to the tray 11.

Once the organic sample has been taken and placed in the device 17, the male component 12 can be removed from the tray and the sample device 17 removed from the male component. The male component can then immediately be placed, along with the female component 13, into the eartag applicator and the eartag applied. In this way, it can be assured that the eartag is applied to the animal from which the sample has been taken and placed in the device 17.

It is, however, also necessary that there be a correlation between the sampling device 17 and the eartag 12/13. Consequently, the large number 18 which at least appears on one of the tag components (in this case the panel 19 of the female component 13) is also pre-marked (18a) on the sampling device 17. This large number 18 on the visual eartag is generally referred as to the "management number" and will commonly be used by the farmer on-farm for making individual observations from a distance without having to handle the animal to ascertain its identity.

The incorporation of management number 18 and the identical device number 18a on the device 17, ensures that the sample device 17 can be readily (and visually) identified as relating to the eartag in question. For example, when handling cattle it is not uncommon for tags and equipment to be knocked over, dropped, blown around by wind etc. This can lead to components of different tag and collector combinations becoming mixed up.

Therefore, the correlation of the numbers 18 and 18a which are readily visible to the farmer or technician ensures that if components of the kit do become separated (and possibly mixed with components of other kits being used at the same time) the set (or individual sets) of components can be accurately reassembled. In essence, the farmer is able to ensure, in a very simple and straightforward manner, that the correct management eartag 12/13 is always associated with the correct device 17.

In addition, the unique identifier number 20 which is provided by the supplier of the device 17 is also pre-marked (20a) on the female tag component 13. This identification number 20 is also provided in bar code form 21 on the device 17.

As illustrated in the drawings, the female component 13 and the device 17 can also carry a producer's identification number 22. In Australia, this is commonly referred to as the producer's PIC (Property ID code).

In the preferred form of the invention the female tag component 13 preferably also includes a logo 23 or some other form of identifier to provide a visual indication that the animal is one from which a DNA sample has been taken and is stored in a relevant database/sample holding facility.

The DNA label unique number 20 will be cross-referenced in electronic format with the producer's number 21 and the management number 18 to allow for trace back when required.

An added advantage of marking a tag in the manner disclosed herein is that it will be accepted as a transaction tag if the animal is traded.

It is also proposed according to the present invention, that when the tag manufacturer produces the eartag a Tag Bucket File will be electronically transferred to the database of the DNA recording/holding facility (herein "the service provider"). The implications for this service provider:

The key reference number would be the DNA label unique number 20 as supplied by the service providers on the device 17.

The database will have a matched field for unique number 20 and the combination of the producer identification number 21 and management number 18 printed not the visual tag.

The information on each component in the kit 10 ensures they can be easily linked together if inadvertently mixed.

If a farmer calls the service provider, the service provider should be able to reference the animal by quoting either:
a) the unique identifier number 20 printed on the visual tag; or
b) the combination of the producer's identification number 21 and management number 18.

In Australia, the National Livestock ID Scheme (NLIS) is currently being implemented on a voluntary basis by all States except Victoria, where it has already been made mandatory. Other States were expected to begin mandatory implementation in June 2004. This means that all new calves will be tagged with an improved NLIS device prior to leaving their property of birth. Exceptions will be made for cattle going direct to slaughter, or for live export.

Figure 3:
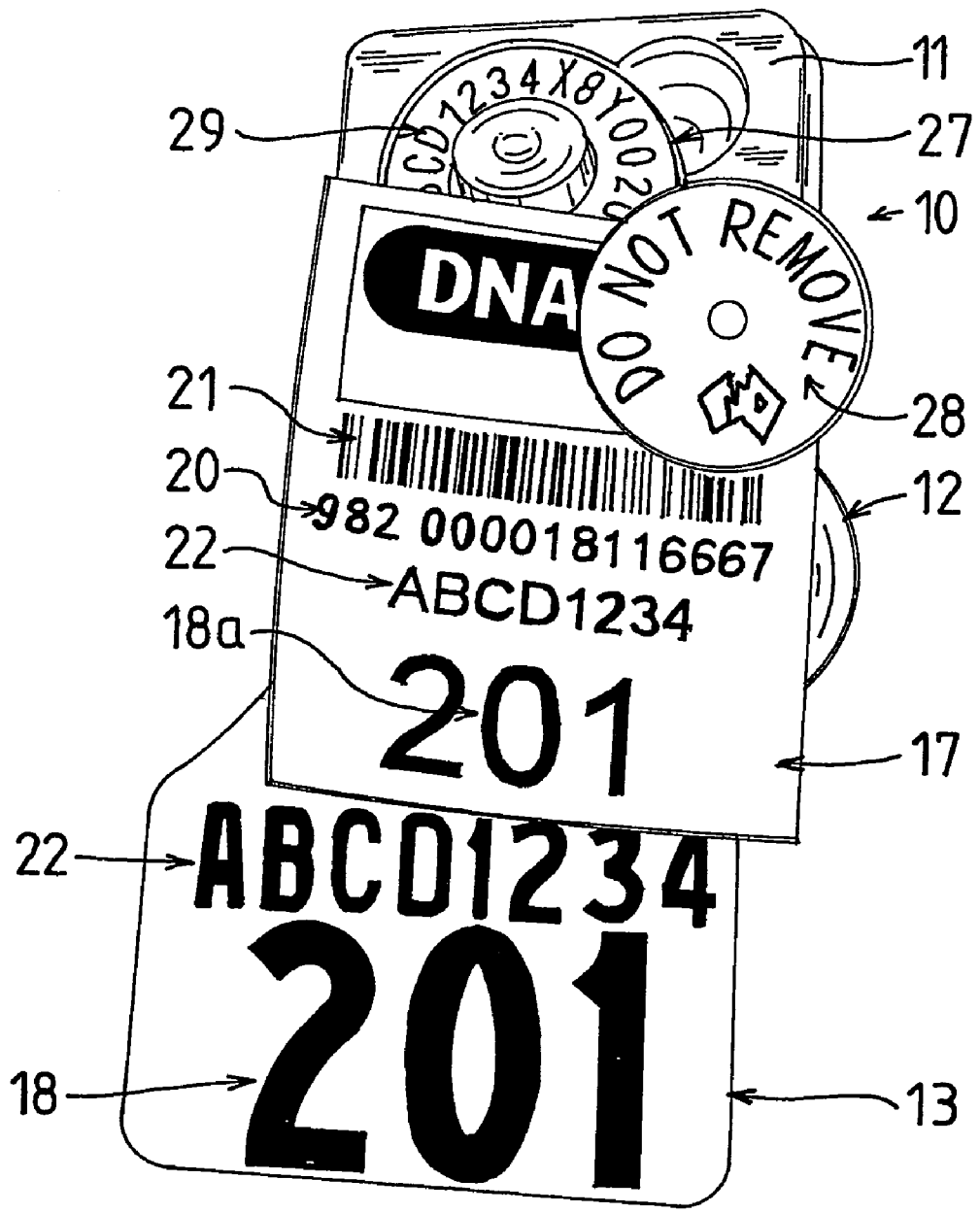
FIG. 3 is a view similar to FIG. 1 but further showing incorporation of an electronic identification device.
Figure 4:
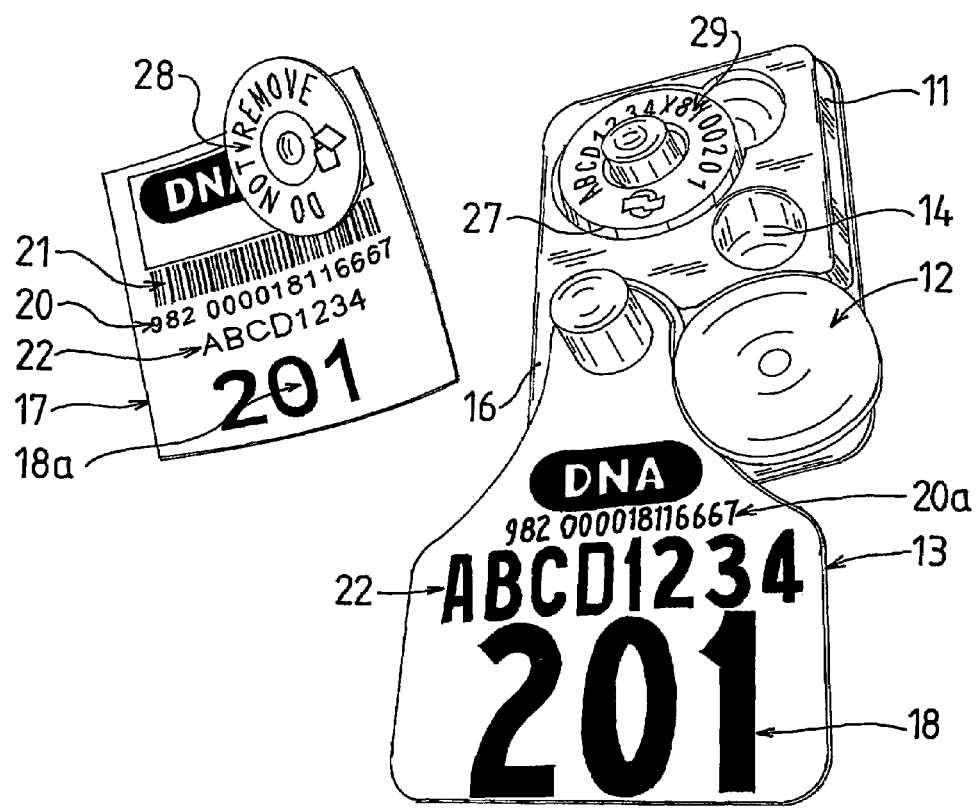
FIG. 4 is an illustration similar to FIG. 2 but showing the electronic identification device and the sample storage device associated with a component used for mounting of the electronic device to an animal.

The NLIS device is an electronic device 27 of the type manufactured and marketed under the brand ALLFLEX®. Therefore, according to the second embodiment of the present invention as shown in FIGS. 3 and 4, the electronic device 27 is placed in recess 25 and engages on pin 15. A further recess 26 is provided into which male component 12 is engaged. In recess 14 there is engaged the head of a second male component 28, which is used for mounting of the electronic device 27 to the animal's ear.

The NLIS device is commonly referred to as a RFID (Radio Frequency ID) and is sometimes called EID (Electronic ID). The device 27 comes pre-programmed with a 15-digit number, this being the number which is seen on a computer screen when the tag is scanned using a reader.

On the outside of the NLIS device 27 is a number called the NLIS number 29.

The NLIS number 29 is of nineteen alphanumeric characters and has five parts.

PIC—Tailtag number—the first eight alphanumeric characters.

Device manufacturer and type code. One alpha character, which in this case is "X" which signified an ALLFLEX® eartag.

NLIS Class—One alpha character, in this case "B" to signify BREEDER device, as opposed to POST BREEDER "E".

Management Number. User definable by the producer. Five characters, the first can be alpha, or numeric. In this case "12345".

When the NLIS tag 27 is produced, the manufacturer's computer system interacts with the NLIS database to ensure duplicate RFID or NLIS numbers are not produced. New RFID tags 27 are inserted into the production line. The computer system reads the RFID number inside the tag and matches it to an NLIS number that the NLIS database has approved. The laser then prints the NLIS number 29 onto the outside of the RFID tag 27.

After the tags are printed, the manufacturer's system sends a file to the NLIS database called an association file that lists each RFID 27 and matching NLIS number 29. The manufacturer also produces a similar file called a Tag Bucket File that producers can use with their own on-farm electronic systems, such as scale heads, software packages etc. A sample of the Tag Bucket File is shown below.

NA291171XBU0002, 982 000003510421
NA291171XBU0003, 982 000003520841
NA291171XBU0004, 982 000003541646
NA291171XBU0005, 982 000003582806
NA291171XBU0006, 982 000003521012

As with the previously described embodiment, a management number 18 is marked on the panel of the female component 13. This is carried over as number 18a on the sampling device 17. With regard to the electronic tag 27, it is relatively easy to isolate the management number 18 from the NLIS number 29 because the management number constitutes the last five digits of the NLIS number.

With this embodiment of the invention, the unique number 20 is the RFID number of the electronic device. Thus, when the tag manufacturer produces the tags it will, as proposed in the first embodiment, electronically transfer to the database of the supplier a Tag Bucket File. The key reference number in this instance will be the RFID number. Consequently, if a farmer calls the service provider the farmer should be able to quote the RFID number (if the farmer can scan the electronic tag 27) or visually read the NLIS number 29 from the outside of the electronic tag.

In the event that the farmer does not have the ability to scan the electronic device 27, the RFID number can be ascertained by reference to the visual tag component 13, where the unique RFID number 20 is marked along with the NLIS number 29.

Therefore, according to the present invention, there is provided a package or kit of selected components/products from different suppliers. This enables a farmer to be offered the advantage of a total system incorporating the benefits of both the DNA recording products and the visual/electronic products with the added advantage of data transfer integrity. Even if the individual components become separated the easy reference to the management number will enable the individual components to be collated so as to ensure that all the correct components are associated with a particular animal.

In addition there is little likelihood of the human error which can occur with current systems where a management number for example, needs to be manually applied by a farmer to one or both of the visual tag and the sampling device.

It is anticipated that according to the present invention, a farmer would be supplied with a number of conjoined trays 11 and then would simply separate one tray from the rest and use that tray for a particular animal. A further tray would then be released for use with the next animal to be tagged and sampled.

The invention claimed is:

1. A system for identification of animals, the system including an animal identification device adapted for application to an animal and a device for secure storage of organic material taken from the animal to be identified by the identification device, the secure storage device removably secured to the identification device, the storage device and identification device each being marked with a common identifier, and a storage holder receives the identification device and the storage device prior to use in such a way that the organic material taken from the animal to be identified is stored in the storage device while mounted on the storage holder in which the identification device and the storage device are mounted prior to use.

2. The system of claim 1 wherein the storage holder is in the form of a moulded tray.

3. The system of claim 2 wherein the storage holder includes a recess configured to removably retain a head of a male part of an eartag identification device.

4. The system of claim 3 wherein the storage holder includes a retention device with which a female part of the eartag is removably retained.

5. The system of claim 3 wherein the storage holder includes a recess in which a part of the female part of the eartag can reside, and a stud onto which the female part can be installed.

6. The system of claim 3 further including a second recess for the head of a male part of a second identification device and a second recess with stud for a female part of a second identification device.

7. The system of claim 6 wherein the second identification device is an electronic identification device.

8. The system of claim 2 wherein the tray is formed as one of a plurality of conjoined trays.

9. The system of claim 1 wherein the identification device is an animal eartag or a bolus.

10. The system of claim 9 wherein the eartag, is a two-component eartag.

11. The system of claim 1 wherein the storage device is removably secured to the or one component of the eartag.

12. The system of claim 11 wherein the identification device can also include an electronic identification device.

13. The system of claim 12 wherein the common identifier can be part of the unique number of an electronic identification device.

14. The system of claim 12 wherein the common identifier is an on-farm management identifier used for visual identification purposes.

15. The system of claim 14 wherein the common identifier forms part of a unique number of an electronic identification device.

16. The system of claim 1 wherein the common identifier is an alpha, numeric or alphanumeric marking.

17. The system of claim 1 wherein the common identifier is an on-farm management identifier used for visual identification of the animal.

18. A method of identification of an animal including providing a storage holder which has an animal identification device marked with an identifier marking and a secure storage device, the secure storage device removably secured to the identification device, the secure storage device also being marked with the same identifier marking, the method including the steps of taking a sample of organic material from the animal and placing the sample in the secure storage device, removing the identification device and storage device from the storage holder, applying the identification device to the animal and placing the storage device in a secure storage facility, wherein the storage holder receives the identification device and the storage device prior to use in such a way that the organic material taken from the animal to be identified is stored in the storage device while mounted on the storage holder.

* * * * *